United States Patent [19]
Van Lintel et al.

[11] Patent Number: 5,997,263
[45] Date of Patent: Dec. 7, 1999

[54] MICROMACHINED FILTER FOR A MICROPUMP

[75] Inventors: Harald Van Lintel, Lausanne; Yit Shun Leungki, Geneva, both of Switzerland

[73] Assignee: Westonbridge International Limited, Dublin, Ireland

[21] Appl. No.: 09/117,580

[22] PCT Filed: Feb. 10, 1997

[86] PCT No.: PCT/EP97/00624

§ 371 Date: Jul. 29, 1998

§ 102(e) Date: Jul. 29, 1998

[87] PCT Pub. No.: WO97/29283

PCT Pub. Date: Aug. 14, 1997

[30] Foreign Application Priority Data

Feb. 9, 1996 [FR] France .................................. 96 01628

[51] Int. Cl.[6] ................................................. F04B 17/00
[52] U.S. Cl. ..................................... 417/413.2; 417/413.3
[58] Field of Search ........................... 417/413.2, 413.3; 210/322, 323.1

[56] References Cited

U.S. PATENT DOCUMENTS

| | | |
|---|---|---|
| 4,797,211 | 1/1989 | Ehrfeld et al. . |
| 4,895,562 | 1/1990 | Hok ........................................ 417/566 |
| 5,085,562 | 2/1992 | van Lintel ............................... 417/413 |

FOREIGN PATENT DOCUMENTS

| | | |
|---|---|---|
| 587912 | 3/1994 | European Pat. Off. . |
| 2248891 | 4/1992 | United Kingdom . |
| WO 9519502 | 7/1995 | WIPO . |

*Primary Examiner*—Timothy S. Thorpe
*Assistant Examiner*—Ehud Gartenberg
*Attorney, Agent, or Firm*—Wolf, Greenfield & Sacks, P.C.

[57] ABSTRACT

The micropump (11) has at least two first plate-forming means (10, 12) together defining a pump chamber (9), and the filter comprises liquid feed means, liquid collection means, second plate-forming means (10), and silicon plate-forming means (12; 15), said second plate-forming means (10) and said silicon plate-forming means (12; 15) facing each other and forming between them a cavity (13) for receiving a liquid, the cavity being partially closed by at least one transverse partition (20; 20') whose height is less than the depth of the cavity (13) and which separates it into an upstream portion and a downstream portion. Said silicon plate-forming means (12; 15) are fixed at least partially in leakproof manner to said second plate-forming means (10), the downstream portion of the cavity (13) communicates with said pump chamber (9), and the assembly comprising all of the plate-forming means (10, 12) constitutes a sandwich structure.

22 Claims, 5 Drawing Sheets

MICROMACHINED FILTER FOR A MICROPUMP

The present invention relates to a micro-machined filter for a micropump having at least two first plate-forming means which define a pumping chamber.

More precisely, the present invention relates to a filter which makes it possible within a liquid to retain particles of excess size (e.g. impurities) that are moving towards and through one or more valves of a micropump, so as to avoid impeding operation thereof. This problem arises particularly, but not exclusively, with micropumps of the piezoelectrically controlled type or with a sensor, such as a pressure sensor, said components receiving a liquid between an element made of silicon and an element made of glass that faces the silicon element.

With micropumps, there also arises the problem of leakage rate when the pump is not in operation. Another object of the present invention is to limit leakage rate of a micropump which is not in operation. Too great a leakage rate through a micropump can be harmful to proper operation, to reliability, and to the precision of such a micropump. For micropumps that are to be implanted in the human body to deliver liquid at a well-controlled rate, it is important for the reliability of such a pump to be long-lasting.

An object of the present invention is to provide a micro-machined filter for a micropump so that the liquid leaving the filter does not contain particles of excessive size capable of impeding proper operation of any of the elements and members of the micropump.

To achieve this object, the filter is characterized in that said filter comprises liquid feed means, liquid collection means, second plate-forming means and silicon plate-forming means, said second plate-forming means and said silicon plate-forming means facing each other and forming, between them, a cavity designed to receive a liquid, said cavity being partially closed by at least one transverse partition of height that is smaller than the depth of the cavity and which separates the cavity into an upstream portion and a downstream portion relative to said partition, said silicon plate-forming means being fixed at least in part in leakproof manner on said second plate-forming means; in that said downstream portion of the cavity communicates with said pump chamber; and in that the assembly comprising both first plate-forming means, the silicon plate-forming means, and the second plate-forming means, constitutes a sandwich structure.

By means of the invention, the problem of particles whose excessive size is harmful to the operation of a component such as a micropump is solved by interposing a partition shutting off partially and almost entirely a longitudinal cavity along which the fluid flows.

Two functions of the filter of the invention can thus be distinguished: reducing leakage rate through the valves; and improving the reliability of the micropump. The flow of liquid through the inlet and/or outlet valves when the micropump is at rest is small, providing the size of the admitted particles is small. In addition, because of the filter, when the micropump is active, there is no risk of a particle of excessive size preventing a valve from closing and disturbing priming of the micropump.

With such a filter, resistance to liquid flow is very small, while maintaining a high level of filtering. The partition preferably crosses the cavity in a folded hairpin-bend configuration. This makes it possible to keep the dimensions of the filter small for given total length of partition.

In the embodiments described below, the cavity is a groove etched in the surface of a silicon plate. In the preferred embodiment of the filter for a micropump, one of the first plate-forming means and the silicon plate-forming means constitute a single plate and the other of the first plate-forming means and the second plate-forming means constitute a single glass plate.

Other characteristics and advantages of the present invention appear better on reading the following description of embodiments of the invention given as non-limiting examples. The description refers to the accompanying figures, in which.

Figure 1:
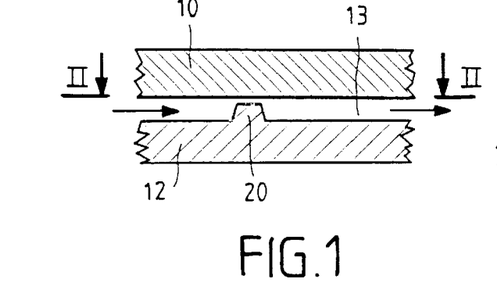
FIG. 1 is a simplified longitudinal section of the filter of the invention.
Figure 2:
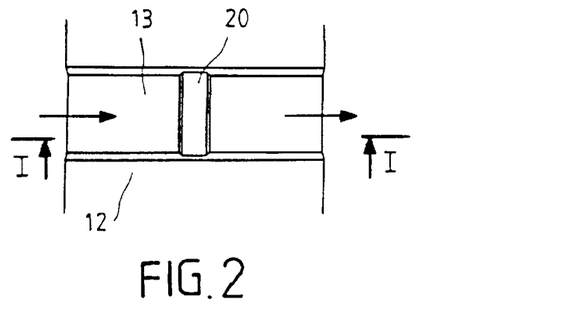
FIG. 2 is a plan view of the FIG. 1 on line II—II.

The filter shown in FIGS. 1 and 2 comprises a glass plate 10 stacked on a silicon plate 12, a groove 13 being formed between the two plates by etching the silicon plate, the groove serving to allow a fluid to flow, with flow taking place in the direction shown by the arrows. The assembly constituted by the glass plate 10 and the silicon plate 12 typically constitutes a stack of the kind present in numerous electronic components based on silicon technology. The plates 10 and 12 may, for example, be fixed to each other by the anode welding technique, the principles of which are described below. To make the filter, it is necessary before such welding, to create a longitudinal groove 13 on the outside surface of the plate 12 which is going to face the glass plate 10. This longitudinal groove is partially, but not entirely, obstructed by an obstacle in the form of a partition 20 extending across the entire width of the groove 13 but not over its entire height.

The groove and the partition can be made using techniques of etching or selectively growing silicon oxide, which techniques make it possible to work using dimensions that are very small, such as dimensions that are smaller than 1 micrometer ($\mu$m).

By means of the partition 20, the fluid flowing between the glass plate 10 and the silicon plate 12 passes over the partition 20, the gap between the top of the partition and the outside face of the glass plate 10 facing the partition 20 stopping impurities of size greater than said gap.

Figure 3:
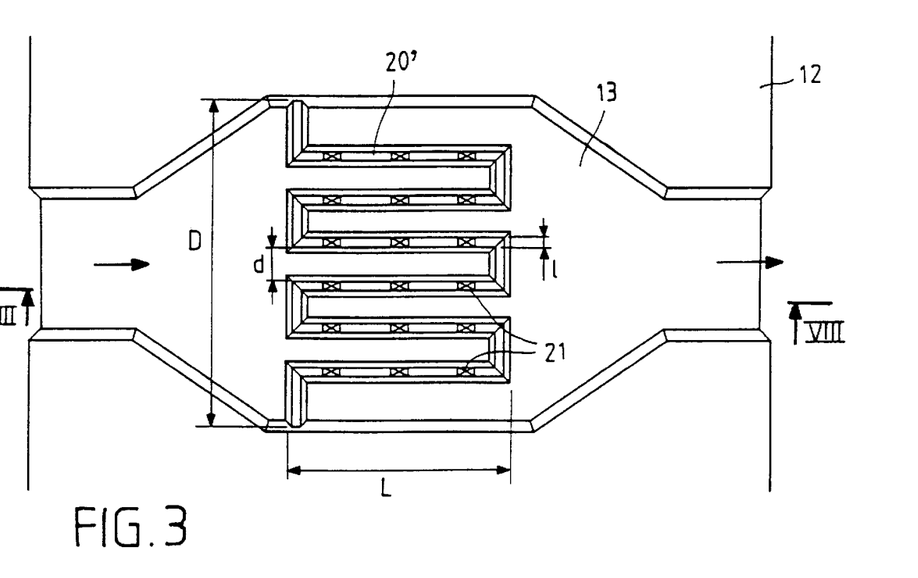
FIG. 3 is a plan view of a preferred embodiment of the filter.

In order to avoid the groove having too great a width D at the partition, it is preferable to make the partition with a folded hairpin-bend configuration 20'. An example of a partition having this structure is given in FIG. 3. Because of the hairpin-bend shape, a compact structure is obtained having resistance to fluid flow past the partition 20' that is very low. In this configuration, the partition 20' comprises first partition elements forming longitudinal rectilinear branches parallel with the longitudinal direction of the groove 13 and second partition elements forming shorter transverse rectilinear branches placed alternately at the front and rear ends of the longitudinal branches so as to interconnect them and form a continuous partition between the side walls of the groove 13. In FIG. 3, a partition 20' is shown following a sinuous path between the side walls of the groove 13 and made up of identical first partition elements placed at regular intervals in parallel and side by side going from one of the sides to the other, each of the first partition elements being connected firstly via its front end and secondly via its rear end to the two adjacent first partition elements via respective second partition elements.

The partition 20 or 20' preferably possesses side walls that slope relative to the direction orthogonal to the plane faces of the silicon plate 12. Under such circumstances, the profile in cross-section of the partition forms a trapezium or trapezoid, however a triangular or rectangular profile is also suitable, as are variants with more rounded outlines such as profiles that are semi-oval or semi-circular.

Figure 4:
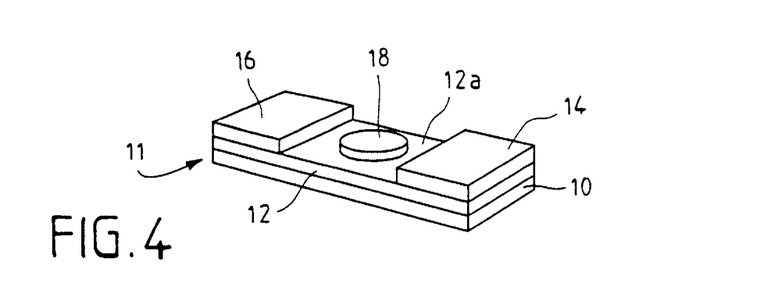
FIG. 4 is a simplified perspective view of a micropump.

As already mentioned, the invention is particularly applicable to filtering liquid flowing through a micropump. FIG. 4 is a diagram of such a micropump which is constituted by a first plate 10 made of glass in which there are formed an inlet orifice and an outlet orifice for the pump, a silicon plate 12 constituting a deformable membrane, and two pieces of glass 14 and 16 fixed on the other face of the silicon plate 12, leaving free a portion of the outside face 12*a* of the silicon plate 12. To avoid imparting mechanical stresses to the structure, the bonding between the glass 10, 14, and 16 and the silicon 12 is preferably performed by anode welding. This technique which is known per se consists in raising the assembly of silicon and glass parts to a temperature of about 300° C., and in placing the stack between two electrodes in contact with the silicon and glass plates, while applying a negative potential of about −1000 V to the electrode pressed against the glass. A leakproof weld is thus obtained at relatively low temperature between the silicon membrane and the various parts made of glass. The operation of the pump is controlled by a piezoelectric actuator 18 which is fixed on the free face 12*a* of the silicon plate 12. The mechanical stresses induced by applying electrical control signals to the piezoelectric actuator 18 cause the membrane 12 to deform, thereby causing liquid to enter and exit a space of the micropump situated between the glass plate 10 and the silicon plate 12, this space forming a pump chamber 9.

For full operation of such a micropump, reference can be made, for example, to international patent application No. PCT/IB95/00028.

Figure 5:
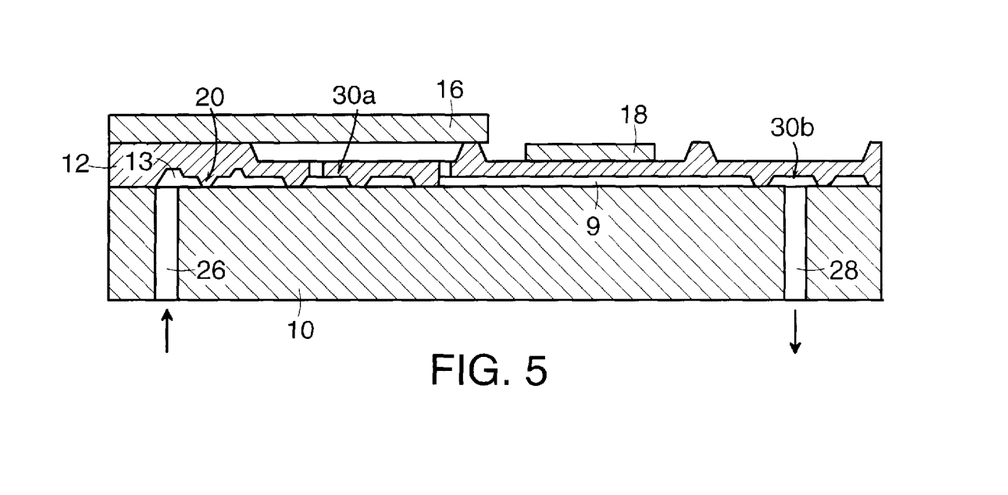
FIG. 5 is a vertical section view of a filter of the invention integrated in a micropump.
Figure 6:
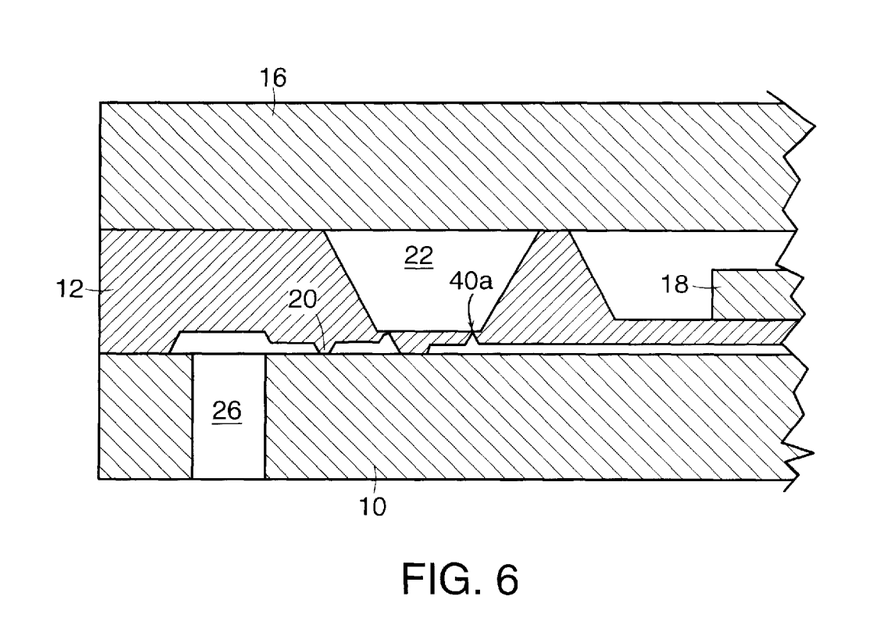
FIG. 6 is a fragmentary vertical section view on a larger scale of a filter of the invention integrated in a different model of micropump.

In FIGS. 5 and 6, the same references are used to designate portions of the micropump that have already been described with reference to FIG. 4. In FIG. 5, there can be seen the inlet orifice 26 of the micropump and its outlet orifice 28. The micropump of FIG. 5 is fitted with an inlet valve 30*a* and with an outlet valve 30*b*. The valves 30*a* and 30*b* are machined in the silicon plate and they are of the type comprising an annular gasket resting an outside face of the glass plate 10. The inlet valve 30*a* constitutes a member for controlling ingress of liquid situated downstream from the groove 13, i.e. downstream from the filter, and upstream from the pump chamber 9.

In FIG. 6, only a portion of the micropump is shown in section. The valve 40*a* is used that is of a type that is different from those in FIG. 5: it is a membrane valve. The filter is made on the same silicon plate 12 as the inlet valve. Nevertheless, when the silicon plate 12 is mounted on the glass plate 10, the filter is not in direct communication with the inlet valve 40*a*, and in the case shown in FIG. 6, the liquid transits firstly via a link space 22 before reaching the inlet valve 40*a*.

When machining the silicon plate 12, the partition 20 of the filter is upstream relative to the portion of the silicon plate 12 facing the piezoelectric actuator 18 and serving as the deformable membrane, and when an inlet valve 30*a* or 40*a* is present, the inlet valve is placed downstream from the filter. When the liquid is flowing, liquid coming out from the inlet duct 26 of the micropump passes firstly through the filter 20, then through the link space 22, and passes via the inlet valve 30*a* or 40*a* which opens when the pressure difference on opposite sides of the valve is great enough.

By means of the micropump device of the invention, the valve and/or the micropump does not operate wrongly due to particles of excessive size (e.g. impurities) jamming in the places where the liquid flows. Thus, the inlet valve and the outlet valve can close and remain leakproof when the micropump is not in operation, thereby making it possible to avoid leaks or pressure losses via the micropump.

In the examples shown in FIGS. 1 to 6, the filter is made on the same plate of silicon as the micropump: the filter is integrated in the structure of the micropump. Nevertheless, it is also possible to make a filter between two other plates, a glass plate and a silicon plate, and to connect the filter, e.g. by anode welding, to the glass plate of the micropump which contains the fluid inlet duct: this provides a sandwich structure that is compact.

Figure 7:
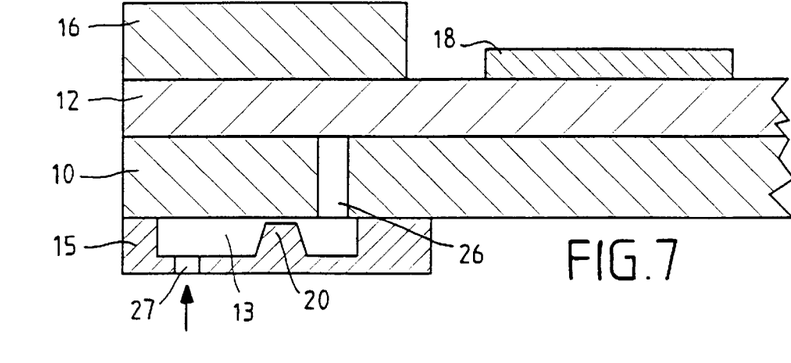
FIG. 7 is a simplified vertical and longitudinal section view of another embodiment of a filter for a micropump.

FIG. 7 shows an intermediate case where the first silicon plate-forming means 12 are separated from second silicon plate-forming means 15 by a glass plate 10 constituting simultaneously both first glass plate-forming means and second glass-plate forming means. The silicon plate 15 has an inlet orifice 27 opening out into a groove 13 that includes the partition 20, the downstream portion of the groove 13 communicating with the inlet orifice 26 of the micropump.

In the examples described above, various possibilities are envisaged for stacking plates of glass and silicon, nevertheless other types of stack are also possible without going beyond the ambit of the invention.

Another important aspect of the filter of the invention consists in performing regular filtering all along the partition by maintaining a constant gap E between the top of the partition and the plane face of the plate (which is preferably but not necessarily made of glass) facing the top of the partition and serving as a ceiling for the cavity or groove 13 containing the liquid. According to the invention, this condition is satisfied by attachment means designed to connect directly with constant spacing said partition to the plate-forming means facing the plate-forming means carrying the base of said partition.

Figure 8:
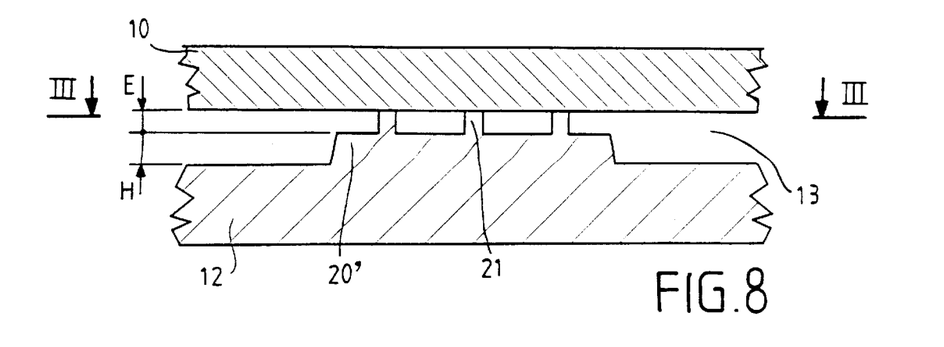
FIG. 8 is a section of the FIG. 3 filter on line VIII—VIII.

An embodiment of such attachment means is shown in FIG. 8 in the form of attachment points 21 connecting the top of the partition 20' to the plane face of the glass plate 10 facing the partition. These attachment points 21 constitute point extensions of the silicon partition 20' and they are fixed, e.g. by anode welding, to the glass plate 10. As can be seen in FIG. 8, the partition 20' is of height H and the attachment points 21 are of height E equal to the gap between the partition 20' and the facing plane face, i.e. equal to the maximum size of particles that can pass through the filter. The minimum size for this gap which forms a slot through which the liquid to be filtered passes can be as little as 0.1 $\mu$m. It is also possible to design attachment points of larger size which constitute pillars between the partition and the glass plate: reference can be made to elements 56 described below with reference to FIG. 9.

It is possible to achieve even more effective filtering by placing at least two partitions 20 and 20' in parallel in the groove 13 so as to have at least two filter units operating in parallel.

Tests have been performed with a series of five partitions placed in parallel on the fluid path, each partition having twenty longitudinal branches. In those tests (see FIG. 3) the width D of the groove 13 was 1 mm at partition 20', the length L of one of the longitudinal branches of the hairpin-bend partition (or width of the hairpin-bend) was likewise 1 mm, the width ] at the top of the partition 20' was 10 μm, and the transverse space d between consecutive tops of two branches of the hairpin-bend partition was 40 μm. In the test, the partition had side walls sloping in a chamfer relative to the direction orthogonal to the plane face of the bottom of the groove 13. Tests were performed in which the width L of the hairpin-bends and the number of partitions placed in parallel were varied: the width L of the hairpin-bends is preferably less than 1 mm, the width d between two adjacent hairpin-bends lies preferably in the range 20 μm to 200 μm, the hairpin-bend partition 20' extends over a length D that is greater than or equal to 1 mm, and the width of the top of the partition lies in the range 1 μm to 20 μm.

When partitions are placed in parallel, in order to share the liquid flow between the various filter units, the micropump device contains means for feeding liquid to each filter unit and means for collecting liquid from the outlet of each filter unit. For example, the means for feeding liquid to each filter unit can be constituted by an inlet channel serving the inlet of each filter unit, i.e. the upstream portion of the corresponding groove, and the means for collecting the liquid at the outlet from each filter unit can be constituted by an outlet channel communicating with the outlet of each filter unit, i.e. the downstream portion of the corresponding groove, with the bottom levels of said channels being lower than the base of each partition 20'.

When filter units are placed in parallel, liquid-sharing means are used to enable the liquid to be distributed uniformly between the various filter units: a deep groove or "cut" having a bottom at a level lower than all of the filter portions capable of receiving liquid. It is also necessary to provide leakproof separation means preventing liquid from passing directly between two adjacent filter units.

Figure 9:
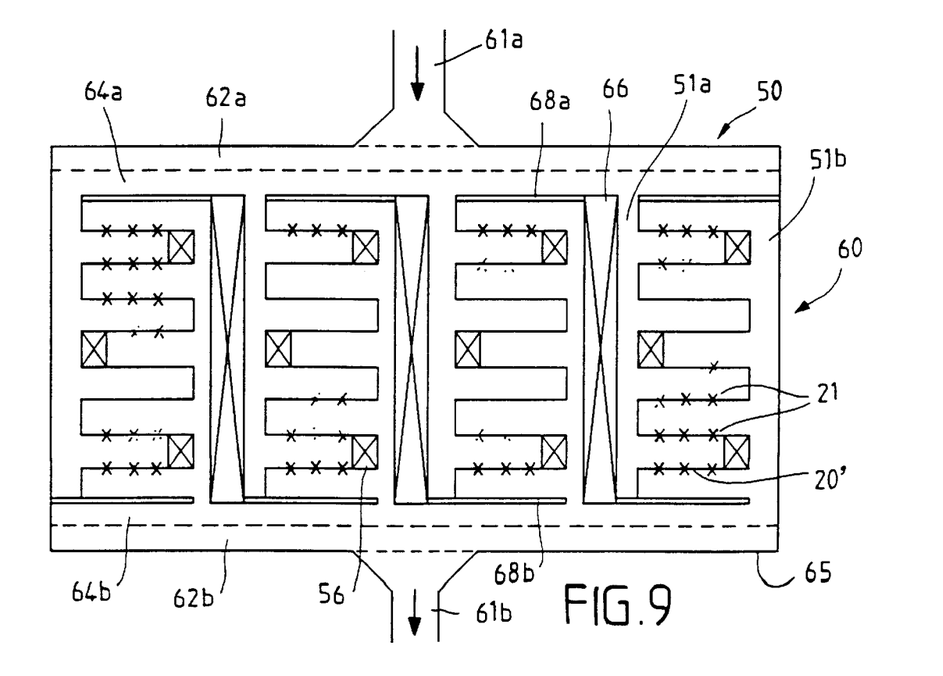
FIG. 9 is a simplified diagram of an example of a filter comprising a plurality of partitions organized in parallel.

An example of an embodiment of a filter 60 having four filter units 50 connected in parallel is shown diagrammatically in FIG. 9. This figure shows the filter 60 which is outlined by the line 65, said line corresponding to the edge of the etched zone in the silicon plate, said zone being a groove 13 when a single filter is used, and the liquid can flow in said zone. From upstream to downstream, i.e. downwards in FIG. 9, the filter 60 has an inlet channel 61a which flares like a funnel at its outlet end, a deep groove 62a or inlet cut of the filter, a liquid feed channel 64a, four filter units placed side by side from left to right, a liquid collection channel 64b communicating with the outlet of each filter unit 50, a deep groove 62b or outlet cut, and an outlet channel 61b whose inlet end tapers like a funnel. The inlet cut 62a, the feed channel 64a, the collection channel 64b, and the outlet cut 62b form cavities that are designed to receive the liquid and that extend over the entire width of the filter 60.

The depth of the inlet cut 62a makes it possible to distribute the liquid uniformly between the filter units, and consequently to distribute substantially equal volumes of liquid to be filtered into each of the filter units 50, thereby making it possible to dimension the filter units accurately, in particular with respect to the height H of the partition which can be reduced while maintaining good efficiency. For manufacturing reasons, it is very difficult to obtain a high partition. In addition, the inlet and outlet cuts 62a and 62b reduce the presence of air which would be harmful when priming the micropump.

In FIG. 9, the separation means are blocks 66 extending along the entire length of the filter zone of the filter 60 and forming separators between adjacent filter units 50. These blocks are rectangular and connect the silicon plate on which the filter 60 is made to the facing glass plate in leakproof manner. Each filter unit possesses a partition 20' following a hairpin-bend path from top to bottom, the partition including rows of attachment points 21 and attachment pillars 56 positioned in some of the fold zones of the partition so as to provide attachment means of size larger than the attachment points.

In order to constrain the liquid to pass over one of the partitions 20', an inlet wall 68a (extending horizontally in FIG. 9) connects the proximal end of one partition 20' to the proximal end of the block 66 situated on its right (the ends in question are at the top of FIG. 9) and constitutes an obstacle for the liquid which must penetrate into the filter unit by going round said wall 68a and passing between the left-hand end of the wall 68a and the right-hand edge of a block 66. For each filter unit 50, this configuration comprises a zone 51a situated between a block 66 and a partition 20' immediately upstream (to the left) of the partition 20' over the entire length of said partition, thereby enabling the liquid to be distributed over the entire length of the partition 20'. Symmetrically to the inlet wall 68a, each filter unit possesses an outlet wall 68b extending horizontally from left to right, connecting the distal end of a block 66 to the distal end of the partition situated on its right (the ends in question being at the bottom of FIG. 9). This outlet wall 68b prevents the liquid from leaving the zone 51a downwards, obliging the liquid to pass over the partition 20' on the right of which there is situated a liquid recovery zone 51b which is closed at its upper portion by the wall 68a and which is open at its lower portion, which constitutes the outlet from the filter unit 50 and which communicates with the liquid collection channel 64b.

The liquid to be filtered flows along the inlet channel 61a, is spread out in the inlet cut 62a, passes into the feed channel 64a for feeding the filter units, passes into one of the zones 51a, passes over the partition 20' situated on the right of the zone 51a, flows down the zone 51b situated on the right of the partition 20', passes into the collection channel 64b which recovers the liquid coming from all of the filter units 50, and flows into the outlet cut 62b before being removed via the outlet channel 61b.

The filter of the invention is fabricated using silicon micro-machining techniques: the partition 20 or 20' and the cavity or groove 13 are made by machining the silicon plate 12. This micro-machining can be performed by oxidizing the substrate or by photolithography. In this way, the groove 13 can be made by etching, the partition being obtained by surface etching. The partition zones constituting the slots through which the liquid passes are made by removing the oxide formed in this position, and the attachment points can be of silicon oxide on which the glass cover of the filter can be connected by anode welding.

In the preferred embodiment of the filter which has one or more hairpin-bend partitions 20' (FIGS. 3 and 9), bubbles of air can appear in the folds of the hairpin-bend partition when the pump is primed. These bubbles of air have the drawback of limiting the length of the hairpin-bend partition that works as a filter. This phenomenon is more marked in the case of FIG. 9 where the liquid flow direction is not orthogonal to the general direction of the hairpin-bend partition, but where the liquid arrives approximately parallel to said direction and where one of the ends of the partition comes into contact with the liquid before the other.

Under the combined effects of the pressure of the liquid arriving upstream from the hairpin-bend partition 20' (arrow P in FIG. 10) and of the liquid advancing by capillarity along the slot above the top 19 of the partition (arrow C in FIG. 10), a bubble of air can form in the hollow of a fold 27 in the hairpin-bend partition when the liquid reaches the top of the partition in the vicinity of the fold, before filling said hollow. Under such circumstances, it is difficult for the air to escape via the slot which is already filled with liquid.

Several different solutions, capable of being combined with one another, have been proposed for solving this problem.

Figure 10:
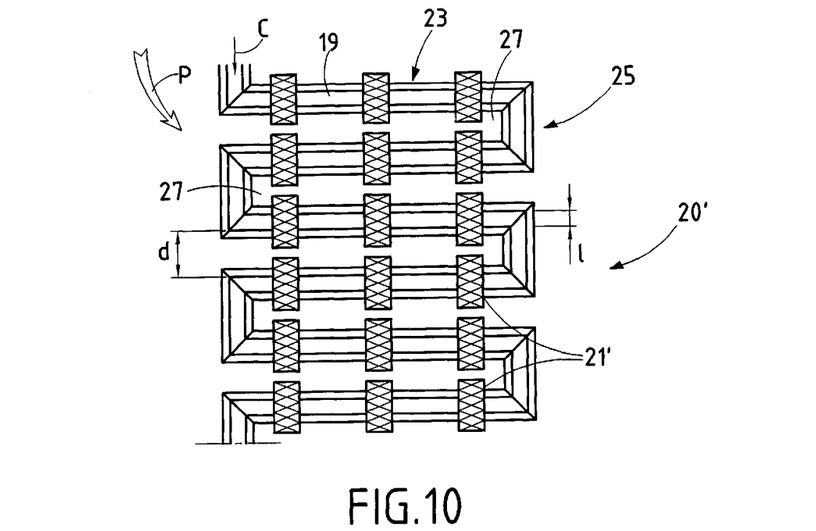
FIGS. 10 and 11 show various embodiments of partitions contained in the filter.

Provision can be made for some of the attachment means to be wider than the width *l* at the top 19 of the partition 20' so as to project on either side of the partition 20'. Such attachment means are shown in FIG. 10 in the form of pillars 21' that are regularly distributed along the first partition elements 23 and that project transversely relative to said first partition elements 23. These pillars 21' constitute obstacles to the flow of liquid by capillarity along the slot facing the top 19 of the partition 20' since the liquid must flow round them, and that is not possible by capillarity since, as shown in FIG. 8, the pillars 21' are connected directly to the glass plate 10 or to any plate situated facing the partition 20'.

In another possibility, over at least a portion of the length of the partition 20', the surface of the partition 20' is hydrophobic so that the above-described phenomenon of capillarity is not possible, even though the pressure of the liquid still enables the liquid to pass through the filter. More precisely, only the top 19 of the partition 20' is made hydrophobic, not the vertical walls thereof. For this purpose, a layer of hydrophobic material can be deposited on the surface of the partition 20' or else the silicon oxide (which is hydrophilic) is withdrawn from the surface of the silicon partition 20', at least over a portion of the length of the partition 20'. While the pump is being primed, this leaves the silicon of the partition 20' in contact with the liquid, and since silicon is hydrophobic this slows down the phenomenon of capillarity, with any subsequent formation of silicon oxide being no longer harmful once the pump has been primed. The hydrophobic layer is preferably placed at least on the surface of the second partition element 25 forming the ends of the folds 27 of the hairpin-bends.

It is also possible to shape and dimension the hairpin-bend partition 20' in such a manner that when the pump is being primed, the inside of each fold 27 of the hairpin-bend partition, on the upstream side of the cavity 13, is entirely filled with liquid before liquid fills the slot portion situated facing the top portion 19 of the partition 20' adjacent to the fold 27. This slot portion corresponds to at least the second partition elements 25. It suffices to select the shape, the profile, the height, the total width, and the width at the top of the partition 20', thereby minimizing the speed at which the liquid flows by capillarity along the slot of the filter.

Figure 11:
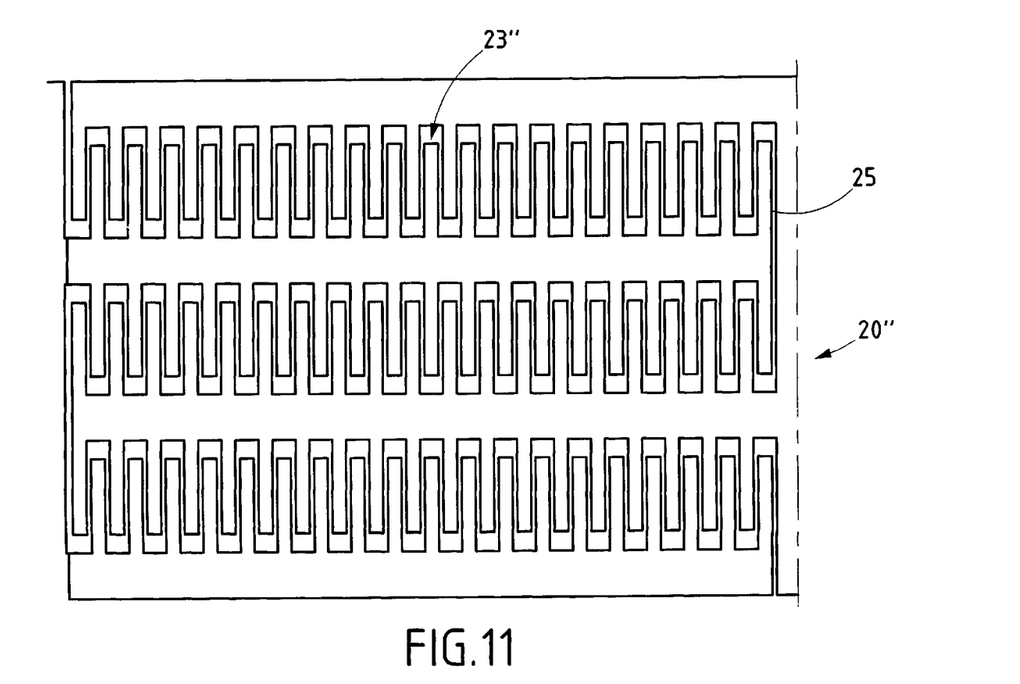

For example, the total length of the partition can be further increased, i.e. the length of the path to be followed by the liquid due to capillarity, thereby reducing the flow speed by capillarity. In one possibility, at least a portion of the length of each bend of the partition 20' is of a zigzag configuration, e.g. of the fractal type. An embodiment is shown in FIG. 11, where the first partition elements 23" of a partition 20" form bends with folds that are close together, such as tight meanders.

It should also be observed that the zigzag configuration makes it possible to increase the section over which the liquid passes. Thus a minimum rate of filtration can be obtained even if bubbles of air should happen to form in some of the folds of the hairpin-bends 23".

In micropumps for medical use, it is preferable, particularly for certain medical fluids that are particularly corrosive, to provide a protective film on the glass surface that is to come into contact with the fluid. Nevertheless, the film cannot extend exactly over the entire exposed surface of the glass, and in particular in the zones adjacent to a bond made by anode welding between glass and silicon it is not possible for full protection to be obtained using a protective film, such that these zones are subject to corrosion by the medical fluid.

Figure 12:
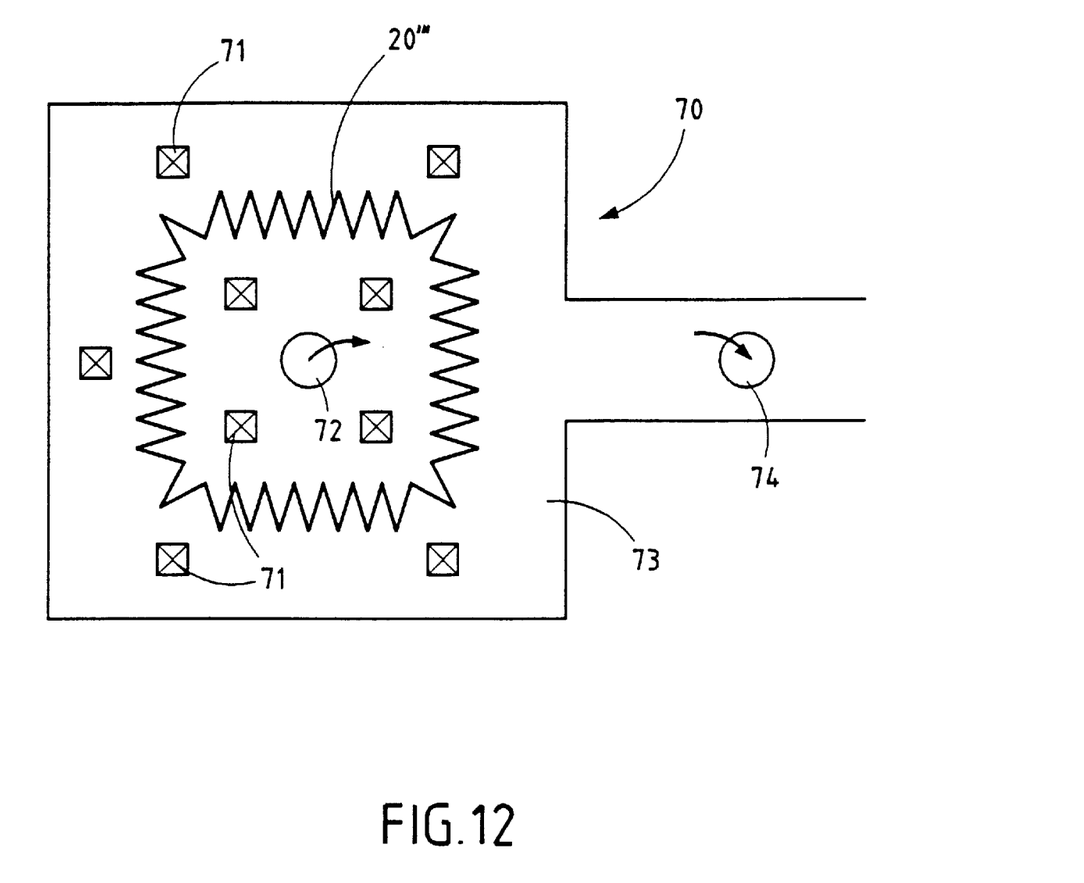
FIG. 12 is a diagram of another possible form of filter of the invention.

In order to reduce the above-mentioned zones which are exposed to corrosion by the medical fluid, it is possible to envisage other forms of filter. An example is shown in FIG. 12 which shows a radial flow filter 70. The filter 70 is made in a groove 73 that is generally broad in shape, formed in the surface of a plate of silicon, having an inlet orifice 72 and an outlet orifice 74. The partition 20''', e.g. of zigzag or crenellated shape, forms a closed loop surrounding one of the two orifices, with the other orifice being placed on the other side of the partition 20'''. In the same manner as described above, pillars 71 placed on or to one side of the partition 20''' enable constant spacing to be maintained between the top of the partition and the plane face of the glass plate 10 facing the partition 20'''.

We claim:

1. A micropump comprising a micro-machined filter and at least two first plate-forming means defining a pump chamber, said filter comprising liquid feed means, liquid collection means, second plate-forming means and silicon plate-forming means, said second plate-forming means and said silicon plate-forming means facing each other and forming, between them, a cavity designed to receive a liquid, said cavity being partially closed by at least one transverse partition that is of a height smaller than a depth of said cavity, that separates said cavity into an upstream portion and a downstream portion relative to said partition, and that extends in a continuous manner between side walls of said cavity, said silicon plate-forming means being fixed at least in part in a leakproof manner on said second plate-forming means, said downstream portion of said cavity communicating with said pump chamber, an assembly comprising both of said first plate-forming means, said silicon plate-forming means, and said second plate-forming means, forming a sandwich structure.

2. A micropump according to claim 1, wherein said partition passes through said cavity where it is folded in a hairpin-bend configuration.

3. A micropump according to claim 2, wherein an attachment between said two first plate-forming means defining said pump chamber and said silicon plate-forming means and said second plate-forming means is performed by anode welding.

4. A micropump according to claim 3, further comprising at least one liquid inlet control member situated downstream from said cavity and upstream from said pump chamber.

5. A micropump according to claim 4, wherein one of said first plate-forming means and said silicon plate-forming means constitutes a same plate of silicon and an other of said first plate-forming means and said second plate-forming means constitutes a same glass plate.

6. A micropump according to claim 1, wherein said partition and said cavity are made by machining a surface of the silicon plate-forming means.

7. A micropump according to claim 1, wherein said partition possesses side walls that are inclined in a chamfer relative to a direction orthogonal to plane faces of said silicon plate-forming means.

8. A micropump according to claim 1, wherein at least two partitions are placed in parallel in said cavity to form at least two filter units, and wherein said filter further comprises liquid feed means for each filter unit and liquid collection means at the outlet from each filter unit.

9. A micropump according to claim 1, wherein said liquid feed means and said liquid collection means comprise respectively an inlet channel and an outlet channel of the filter, bottom levels of said inlet and outlet channels being lower than a base of said partition.

10. A micropump according to claim 8, wherein said liquid feed means and said liquid collection means further comprise liquid distribution means designed to enable liquid to be distributed uniformly between various filter units.

11. A micropump according to claim 10, wherein said distribution means comprise a deep groove whose bottom is at a level that is lower than that of all portions of the filter that can receive the liquid.

12. A micropump according to claim 8, wherein said filter further comprises separation means preventing liquid from passing directly between two filter units.

13. A micropump according to claim 1, wherein said partition comprises attachment means designed to connect said partition to said plate-forming means facing said plate-forming means and carrying a base of said partition with constant spacing.

14. A micropump according to claim 2, wherein a width (L) of the hairpin-bend configuration is less than 1 mm.

15. A micropump according to claim 2, wherein said partition folded into a hairpin-bend configuration extends over a length (D) of at least 1 mm.

16. A micropump according to claim 2, wherein a width (d) between two adjacent portions of the hairpin-bend configuration lies in the range of between 20 $\mu$m to 200 $\mu$m.

17. A micropump according to claim 1, wherein a width at a top (l) of said partition lies in the range of between 1 $\mu$m to 20 $\mu$m.

18. A micropump according to claim 1, wherein said second plate-forming means are made of glass.

19. A micropump according to claim 13, wherein at least some of said attachment means are of a width greater than a width at a top of said partition and project on either side of said partition.

20. A micropump according to claim 2, wherein over at least a portion of a length of said partition, a surface of said partition is hydrophobic.

21. A micropump according to claim 2, wherein said partition is dimensioned in such a manner that an inside of each fold of a hairpin-bend of said partition, on the upstream portion of the cavity is filled completely with liquid before a slot portion situated facing a top portion of said partition adjacent thereto is itself filled.

22. A micropump according to claim 2, wherein at least a portion of a length of each hairpin-bend of said partition is of a zigzag configuration.

* * * * *